United States Patent

Kolankowsky

[15] 3,638,204

[45] Jan. 25, 1972

[54] SEMICONDUCTIVE CELL FOR A STORAGE HAVING A PLURALITY OF SIMULTANEOUSLY ACCESSIBLE LOCATIONS

[72] Inventor: Eugene Kolankowsky, Pleasant Valley, N.Y.

[73] Assignee: International Business Machines Corporation, Armonk, N.Y.

[22] Filed: Dec. 19, 1969

[21] Appl. No.: 886,509

[52] U.S. Cl. .....................340/173 FF, 340/173 R, 307/238, 307/279

[51] Int. Cl. ....................................G11c 11/40, H03k 3/286

[58] Field of Search .....................340/1⁻3 FF, 173 R, 174 R; 307/238, 279

[56] References Cited

UNITED STATES PATENTS

| | | | |
|---|---|---|---|
| 2,813,260 | 11/1957 | Kaplan | 340/174 |
| 3,292,008 | 12/1966 | Rapp | 340/173 |
| 3,363,115 | 1/1968 | Stephenson et al. | 340/173 |
| 3,548,388 | 12/1970 | Sonoda | 340/173 |

*Primary Examiner*—Terrell W. Fears
*Attorney*—Hanifin and Jancin and Gunter A. Hauptman

[57] ABSTRACT

A storage cell especially suited for use in an array of cells wherein cells may be simultaneously accessed by a plurality of different addressing systems for reading and writing of information via independent sensing and bit driving devices. A latch, constructed from field effect transistors (FET) in a known manner, is selected for accessing by driver lines, retaining and indicating information in accordance with signals supplied on a sense bit driver line pair. The number of drivers required to select the cell and the number of sense bit driver line pairs are increased by providing additional FET devices to gate, in accordance with selected driver signals, information between the latch and sense bit driver line pairs selected in accordance with the relative locations of information simultaneously accessed in the array.

14 Claims, 4 Drawing Figures

INVENTOR
EUGENE KOLANKOWSKY

BY Gunter A. Hauptman
ATTORNEY

SEMICONDUCTIVE CELL FOR A STORAGE HAVING A PLURALITY OF SIMULTANEOUSLY ACCESSIBLE LOCATIONS

CROSS-REFERENCES TO RELATED APPLICATIONS

The application discloses a semiconductive cell for a storage unit of a data-processing system. Several embodiments of a data-processing system, and a magnetic core embodiment for a storage unit for such a system, are disclosed in application Ser. No. 886,508 of E. Kolankowsky et al., entitled "Data Processing System With A Storage Having A Plurality of Simultaneously Accessible Locations," filed Dec. 19, 1969 and assigned to International Business Machines Corporation.

A solid-state embodiment of the storage unit is disclosed in Ser. No. 886,511 of E. Kolankowsky et al., entitled "Storage Having A Plurality of Simultaneously Accessible Locations," filed Dec. 19, 1969 and assigned to International Business Machines Corporation.

BACKGROUND OF THE INVENTION

1. Field of the Invention

This invention generally related to electronic data-processing systems having randomly accessible storages and storages for such systems having a plurality of simultaneously accessible locations. In particular, this invention pertains to a preferred embodiment of a semiconductive cell for such storages.

2. Description of the Prior Art

The use of solid-state latch devices as storage cells has become widely known because the deposition of circuits on insulated and semiconductive substrates is particularly adaptable to solid-state circuitry. Such integrated circuit storage arrays are extremely compact and efficient and, when produced in high numbers, are also very inexpensive. Since multibit words are normally stored in a three-dimensional storage with one bit in each plane, it is possible to define each word location by two-dimensional coordinates. Typically, one wire is provided for each coordinate defining a word location. As described in the referenced applications "Data Processing System With a Storage Having a Plurality of Simultaneously Accessible Locations" and "Storage Having a Plurality of Simultaneously Accessible Locations," storage arrays can be constructed wherein more than one location is accessed at any one time by providing additional selectively controlled wires. For example, if two locations are to be simultaneously accessed it is necessary to provide three wires for each storage cell in the array.

Prior art storage cells have been constructed from transistors to form latches which are accessed for reading or writing by a number of wires equal to the number of coordinates necessary to define their locations in an array. In the patent application "Pulse Powered Data Storage Cell," J. J. McDowell, Ser. No. 641,23, filed May 25, 1967 and assigned to International Business Machines Corporation, there is shown a pulse-powered data storage cell for use in monolithic storages that perform storage and/or associative storage functions. These cells each comprise a pair of semiconductor devices which are coupled together to form a bistable circuit. The loads for the bistable circuits are other semiconductor devices which can be biased to regulate current drawn by the bistable circuit from a source for powering the bistable circuit. Together with gating transistors, the circuit is useful in a standard storage array wherein one location is accessed at a time.

SUMMARY OF THE INVENTION

In the invention disclosed herein, a data storage cell of the type described in the reference patent application "Pulse Powered Data Storage Cell," J. J. McDowell, is modified for utilization in a storage array wherein cells may be simultaneously addressed by a plurality of different addressing systems for reading and writing of information via independent sensing and bit driving devices. Additional gating transistors permit the cell to be selected by two out of three coordinates defining the cell location and permit the selection of one of two sense bit drivers. More particularly, the cell comprises a pair of cross coupled field effect transistors and an additional pair of field effect transistors acting as a load. The cell is selected by a diagonal D drive signal activating a pair of gating transistors together with either a horizontal H drive signal or a vertical V drive signal which each activates a corresponding pair of field effect transistors, together with the diagonal drive transistors, comprising AND circuits. Additional gating signals to additional transistors connect either the H drive transistors or the V drive transistors to the sense bit driver. An arrangement using two of three coordinates defining a cell to select a cell, and selecting one of two output/input paths permits cells at two locations to be simultaneously accessed.

DESCRIPTION OF THE PREFERRED EMBODIMENT

Figure 1:
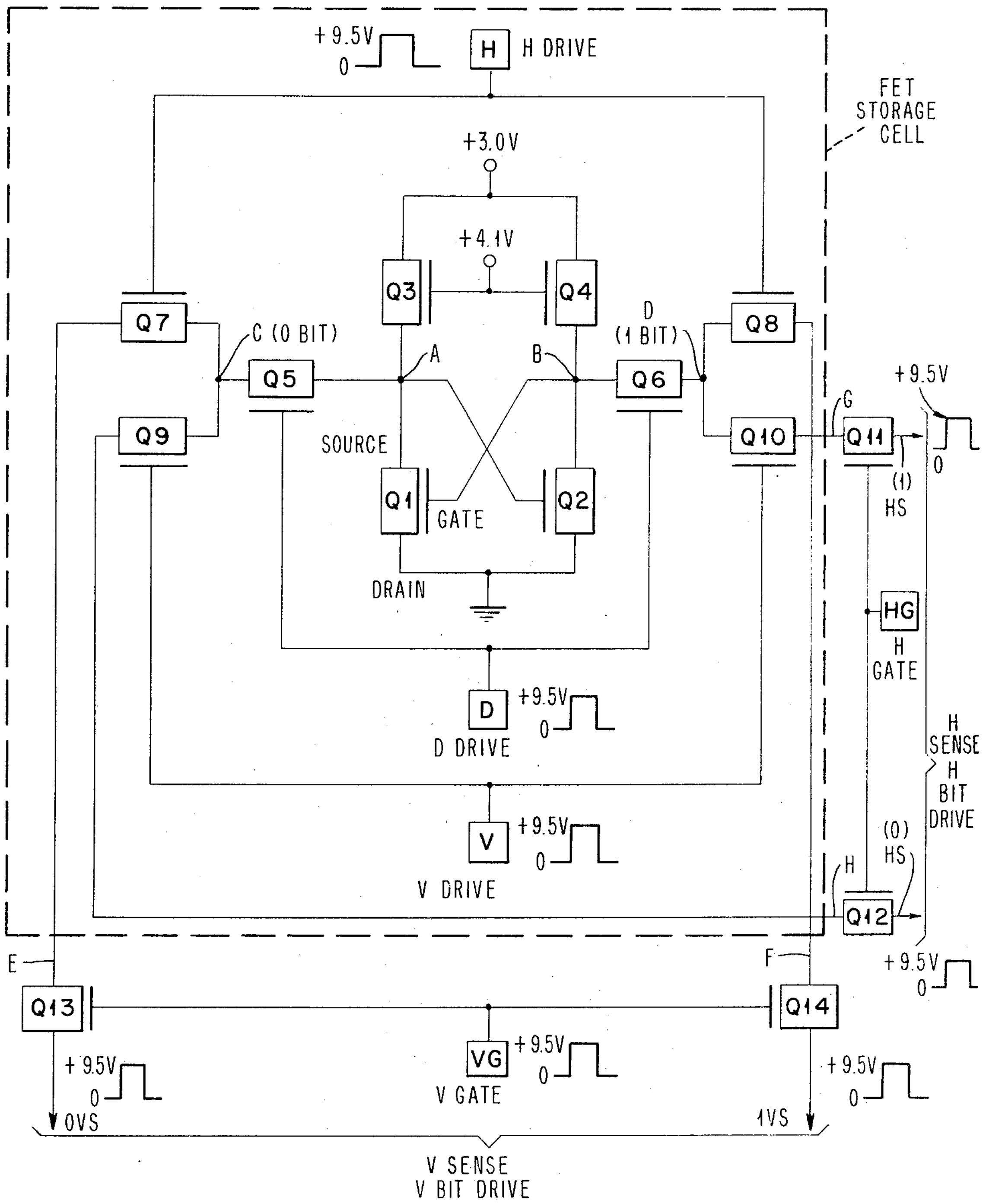
FIG. 1 is a circuit diagram of a storage cell.

Referring to FIG. 1, there is shown a storage cell comprising active devices labeled Q1 through Q14. Each of these active devices may be a transistor. In the particular embodiment shown, the transistors are P-channel, enhancement mode, metal oxide semiconductors (MOS), which may also be called insulated gate field effect transistors (IGT or IRET). Each transistor has three terminals called a gate, drain and source, as labeled for transistor Q1. The drains of devices Q1 and Q2 are connected to ground and the sources are connected through the load devices Q3 and Q4 to a positive voltage. The gates and sources of devices Q1 and Q2 are cross coupled to form a bistable circuit which may store information in accordance with signals received from points C and D through the devices Q5 and Q6. The power of the bistable circuit is controlled by varying the potential at the gates of devices Q3 and Q4. For this purpose the gates of devices Q3 and Q4 are connected together and to a source of positive voltage. If desired, the voltage at the power gating terminal may be alternately raised and lowered to periodically connect and cut off the power to the bistable circuit in order to keep the dissipated energy low and thus prevent overheating of the monolithic storage module in which the cell is used. In such a case, the internal capacitance of devices Q3 and Q4 will maintain the proper operating state of the latch.

Bipolar sensing is used to read information stored in the bistable circuit. For this purpose the device Q5 couples node A to node C and device Q6 couples node B to node D. Node C is a zero-bit point and node D is a one-bit point. The gates of devices Q5 and Q6 are connected together and to a D drive source for the cell so that the potential at nodes A and B can both be read upon the application of a single pulse to the D drive terminal. As will be explained later, the signals from the C- and D-nodes are fed via other transistors into a differential amplifier and compared to determine if a 1 or 0 is stored in the cell. To write information into the cell and thus change its operating state, a pulse is applied to the D drive terminal to turn the device Q5 and Q6 on. Simultaneously, voltages are applied to the C- and D-nodes in a direction desired to store either a 1 or 0 bit. For example, to change the operating condition from a 1 state to a 0 state (that is, device Q1 is "on" and conducting a current and device Q2 is "off"), a positive voltage is applied at the C-node and a negative voltage is maintained at the D-node. This voltage must raise the potential at the gate of device Q1 sufficiently to turn device Q1 off. With device Q1 off, device Q2 is turned on allowing the voltage at node B to rise. The D-drive may then be removed and the cell will be left in its 0 storage state with device Q2 conducting and device Q1 nonconducting. To switch from the 0 storage state to the 1 storage state, a similar process is employed except this time the potential at node D is increased to raise the voltage at node B while devices Q5 and Q6 are conducting. This will turn device Q2 off which drops the voltage at node A and allows device Q1 to go on.

In order to permit additional coordinates to control the selection of the FET storage cell for reading and writing operations, devices Q7 and Q9 are provided for selectively gating control signals to node C and devices Q8 and Q10 are provided for selectively gating control signals to node D. The gates of devices Q7 and Q8 are connected together to a horizontal drive point H and the gates of devices Q9 and Q10 are connected together to a vertical drive point V. Therefore when a signal is applied on the horizontal drive line and on the diagonal drive line, the storage cell nodes A and B will be connected to nodes E and F, while the nodes A and B will be connected to nodes G and H if drive signals are simultaneously supplied on the diagonal drive and vertical drive wires. It can be seen, therefore, that the diagonal drive line must always be activated, together with either the horizontal drive wire or the vertical wire.

A typical storage cell has been described. When the cells are connected into an array of rows and columns, all cells in the same row share a common horizontal drive wire and all cells in the same column share a common vertical drive wire. The cells are also diagonally interconnected with diagonal drive wires. Each horizontal row of cells connects its G- and H-nodes to a sense preamplifier and bit driver (sense bit driver) comprising devices Q11 and Q12 and their E- and F-nodes to a similar unit comprising devices Q13 and Q14. It is possible that all three horizontal, vertical and diagonal drive lines for a storage cell will be simultaneously activated. Since proper operation of the system requires that only one of the horizontal drive or vertical drive wires be effective to connect the cell to external circuits via the sense bit drivers, vertical gate signals VG and horizontal gate signals HG are supplied to the gates of devices Q13 and Q14 and Q11 and Q12, respectively. The HG signal connects nodes G and H and the VG signal connects nodes E and F to the external circuit. During reading operations the selected devices Q11 and Q12 or Q13 and Q14 are connected to a differential sense amplifier and during writing operations they are connected to a bit driver.

Figures 2, 3:
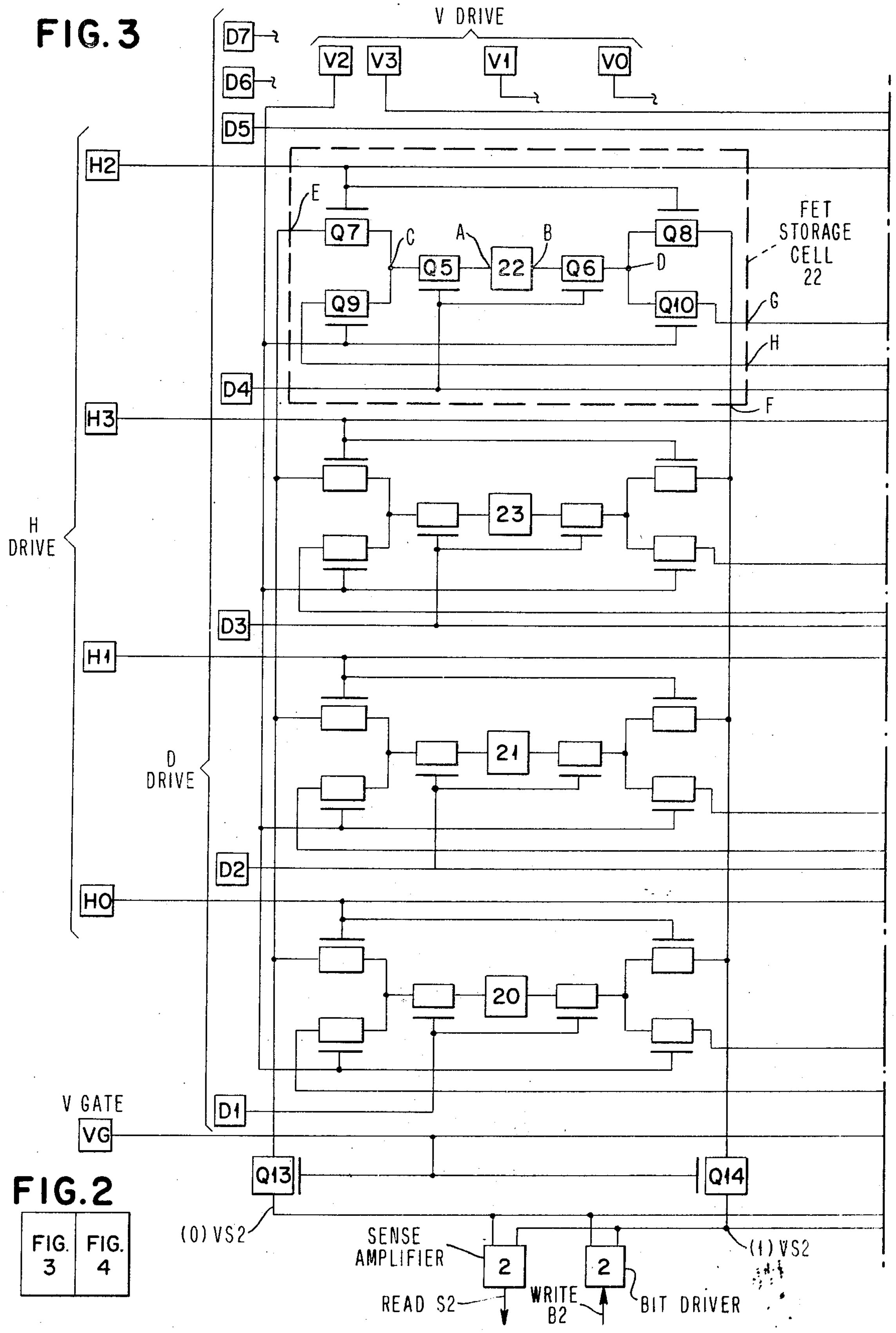
FIGS. 3 and 4 when connected as shown in FIG. 2, form a circuit diagram showing the storage cell of FIG. 1 used in an array of 16 storage cells.
Figure 4:
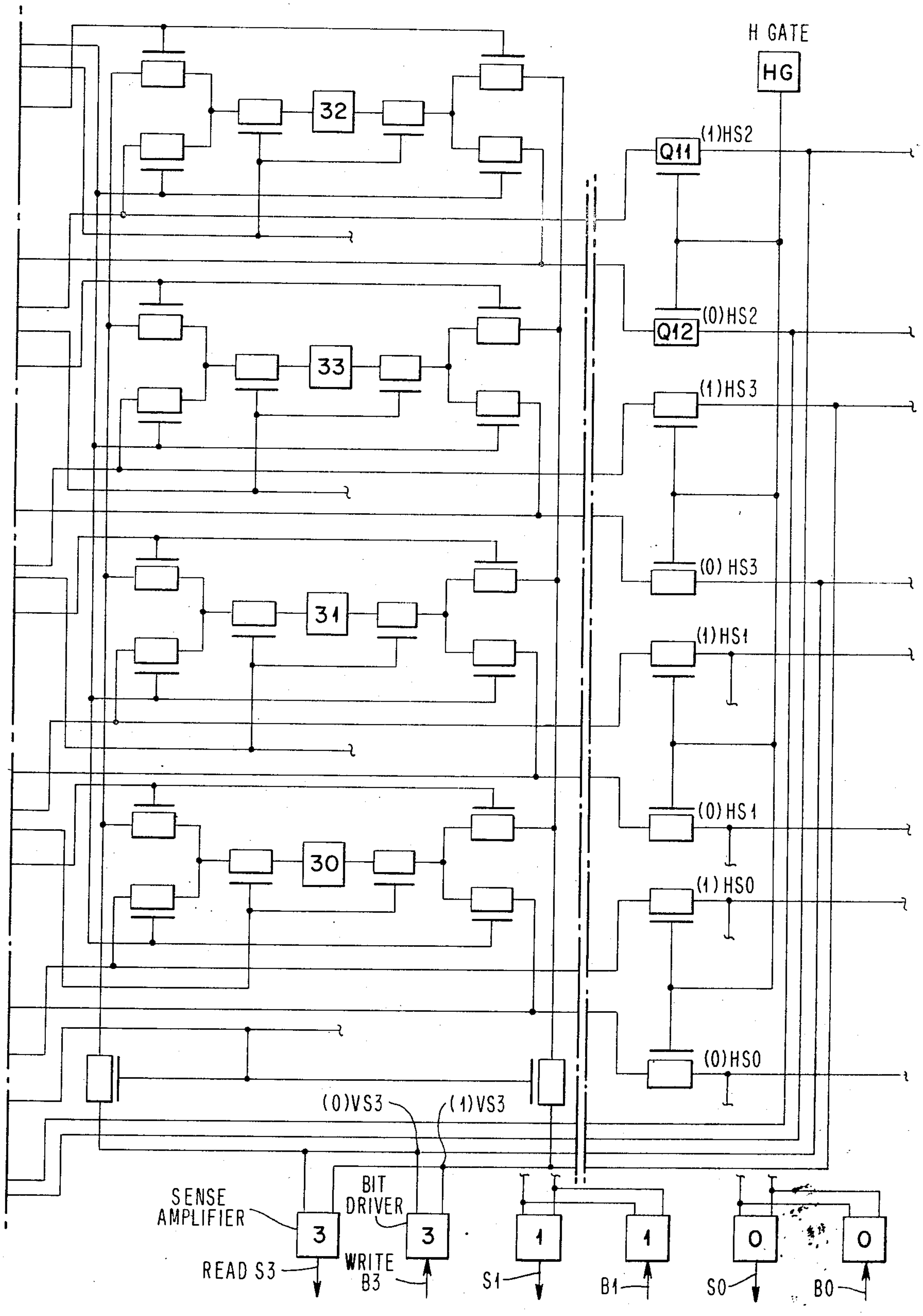

A complete storage array is shown in FIGS. 2 through 4. The storage cell of FIG. 1 is designated FET storage cell 22 and is shown within the dashed line of the array in FIG. 3. The horizontal drive is provided to the gates Q7 and Q8 by a horizontal row driver H2 (also connected to cells 32, 12 (not shown) and 02 (not shown) and the vertical driver V2 is connected to the gates of devices Q9 and Q10 and is also connected to cells 23, 21 and 20). The diagonal driver D4, which is connected to the gates of devices Q5 and Q6, continues on to storage cell 33, 11 (not shown) and 00 (not shown). Nodes E and F are connected to devices Q13 and Q14 and nodes G and H are connected to devices Q11 and Q12. Devices Q13 and Q14 are gated by the vertical gate line VG and devices Q11 and Q12 are gated by the horizontal gate line HG. Any two cells are simultaneously selected, by placing a signal on one of the diagonal lines D1 through D7 and on one of the lines in the group H0 through H3 or in group V0 through V3. While a signal may occur in each of the horizontal and vertical groups, exclusivity is maintained by provision of a signal on either the line VG or HG. The cells are selected as desired by the system utilizing the storage array.

The sense amplifiers S2, S3, S1, and S0 and bit drivers B2, B3, B1 and B0, etc., are connected to either the vertical or horizontal line pairs (0)VS2, (1)VS2 or (0)HS2, 0)HS(1)HS2, etc., In accordance with the locations of the selected cells. If the selected cells are in the same column, the sense amplifiers will be connected to the horizontal rows by a signal on the HG line. If the cells are in the same row, a vertical gate signal VG will connect the sense amplifiers to the proper vertical lines. If the cells are not in the same column or row, the horizontal gate signal HG is also supplied, though, if desired, gate VG could instead occur. During reading operations, sense amplifiers S0 through S3 are used and during writing operations, bit drivers B0 through B3 are used.

EXAMPLES OF OPERATION

An example of operation will now be given with reference to all of the figures. It is assumed that the system desired to access locations 23 and 21. It is further assumed that location 23 contain a 1 bit and that location 21 contains a 0 bit. The system has specified that the contents of location 23 will be read whereas a 1 bit will be written into location 21.

Referring to FIG. 1, the cell 23 is initially in the 1 state as represented by the conducting state of device Q1 and the nonconducting state of device Q2. The cell 21 is initially set to a 0 bit which appears as Q1 nonconducting and Q2 conducting. During the reading operation of cell 23 the state of the cell will be sensed without changing the conducting states of devices Q1 and Q2. However, while writing a 1 bit into the cell 21 the conducting states of devices Q1 and Q2 will be reversed. Referring now to FIGS. 2–4, signals are applied by the system on lines D2, D3, V2 and HG. Referring again to FIG. 1, signals on the V- and D-lines and on the HG lines cause nodes A and B to be connected to nodes G and H in the case of both cells 23 and 21. In the case of cell 23, the devices Q11 and Q12 correspond to the devices in FIGS. 3–5 connected to the (1)HS3 and (0)HS3 lines going to the sense amplifier 3 for sensing the contents of the cell 23 on line S3. In the case of storage cell 21 the corresponding connections are the lines (1)HS1 and (0)HSL for placing signals present on these lines into the cell 21. During the reading operation of cell 23, the conducting state of device Q1 and nonconducting state of device Q2 causes a positive level at node B and a negative level at node A which are sensed through the devices Q5, Q6, Q9, Q10, Q11 and Q12 as a positive level on line (1)HS3 and a negative level on line (0)HS3. The sense amplifier 3 interprets such levels as a 1 bit. During the simultaneous write operation into cell 21, the application of a positive level on line write (1)HS1 and a negative level on line write (0)HS1 results in a positive level at node B and a negative level at node A. The positive level at node B drives device Q1 into a conducting state and the negative level at node A cuts off the conducting state of device Q2. In this way the conducting and nonconducting states of the two devices are reversed and the state of the cell 21 is changed from a 0 to a 1.

While the invention has been shown and described with reference to a preferred embodiment thereof, it will be understood by those skilled in the art that the foregoing and other changes in form and details may be made therein without departing from the spirit and scope of the invention.

What is claimed is:

1. A storage cell simultaneously addressable, in an array of storage cells, by a plurality of addressing systems, comprising:
   - a plurality of binary inputs and outputs;
   - a first plurality of controlled charge carrier devices, connected to a number of said inputs and outputs, interconnected to store a binary signal and to indicate stored signals; and
   - a second plurality of controlled charge carrier devices, connected to said first plurality of controlled charge carrier devices and to selected ones of said binary inputs and outputs, to enable said first plurality of controlled charge carrier devices to exchange information with said inputs and outputs.

2. The storage of claim 1, wherein a selected number of said binary inputs must carry a signal to address the cell and said inputs must supply signals to both the first and second pluralities of controlled charge carrier devices.

3. The storage cell of claim 2, wherein at least one binary input signal to the first plurality of controlled charge carrier devices and a selected number of a plurality of binary input signals to the second plurality of controlled charge carrier devices are necessary to address the cell.

4. The storage cell of claim 3, wherein the second plurality of controlled charge carrier devices is connected to the plurality of binary signal outputs, and the first plurality of controlled charge carrier devices is selectively connected to ones of said outputs, in accordance with binary input signals to said second plurality of controlled charge carrier devices.

5. In a storage cell having a latch formed of a pair of cross-connected stored charge semiconductor devices with a data storage point located at the gate of each of the devices and having other stored charge semiconductor devices coupling said cross-connected devices to bit and drive lines for the storage cell, the improvement comprising means including said other stored charge devices for permitting the storage cell to be addressed for reading or writing through two or more pairs of bit lines including:

- a first set of said other stored charge devices with one such stored charge device in the set coupled to each of the data storage points and the gates of the stored charge devices of the first set being connected to a common drive line; and
- a plurality of sets of said other stored charge devices with one device in each set of the plurality of sets coupling a separate bit line to each device of the first set of stored charge devices and each set in the plurality of sets being driven by a separate drive line so that there are a total of at least three drive lines that can be selected in pairs to couple the latch to one of two or more sets of bit lines whereby the cell can be accessed through two or more bit lines simultaneously.

6. The storage cell of claim 5, wherein said controlled charge carrier devices are three terminal semiconductive devices.

7. The storage cell of claim 6, wherein said semiconductive devices are Field Effect transistors.

8. A multiaccess storage cell accessible by coincident activation of a selected plurality of $n$ driver inputs to communicate information with a selected pair of $n$–1 pairs of sense and driver connections, comprising:

- a storage latch, having $m$ (less than $n$) driver inputs and $k$ (less than $n$–1) pairs of sense and driver points, comprising a plurality of semiconductor devices settable to one state by a signal at said driver points and to another state by another signal on said driver points; and
- a driver gate, comprising a plurality of semiconductors, having $n$–$m$ driver inputs, ($n$–1)–$k$ sense input pairs connected to the latch sense and driver points and $n$–1 pairs of sense and driver outputs.

9. The multiaccess storage cell of claim 8, further comprising:

- a sensing and driver gate, comprising a plurality of semiconductors, having $n$–1 pairs of sense inputs, $n$–1 pairs of sense connections and $n$–1 gate inputs, for connecting the selected driver gate sense and driver output pair with pairs of sense connections in accordance with signals at the gate inputs.

10. A multiaccess storage cell accessible by coincident activation of a selected two out of three driver lines to communicate information with a selected one of two pairs of sense lines, comprising:

- a two state storage latch, having one driver input connected to a first driver line and one pair of sense and driver points, comprising a first plurality of semiconductor devices settable to a first state by a first signal type at said sense and driver points and to a second state by a second signal type at said sense and driver points, the state being detectable by the type of signal available on said sense and driver points; and
- a driver gate, comprising a second plurality of semiconductors, having two driver inputs connected to a second and third driver line, two sense inputs and two pairs of sense and driver outputs, each of the sense inputs being connected to one of the pair of sense and driver points from the storage latch, for connecting the storage cell with one of the two pairs of sense and driver outputs in accordance with a signal at one of the two drive inputs.

11. The multiaccess storage cell of claim 10, further comprising:

- a sensing gate, comprising a third plurality of semiconductors, having two pairs of sense inputs, two pairs of sense outputs connected to the two pairs of sense lines, and two gate inputs, for connecting the selected driver gate sense and driver output pair with one of the two pairs of sense and driver outputs in accordance with signals at the gate inputs.

12. A binary storage cell intended for use in an array wherein groups of binary cells defining binary words are uniquely, but nonexclusively, addressable, utilizing a binary latch, having a first accessing input and a pair of read and write connections, comprising a plurality of controlled charge carrier devices capable of assuming and indicating a selected one of a first and a second stable states in accordance with information supplied on the accessing input and read and write connections; wherein the invention is characterized by the provision of:

- two pairs of controlled charge carrier devices, each device having three terminals, a first terminal of each device in a pair being connected to one of the latch read and write connections which is different for each pair, a second terminal of each device in a pair being connected to a different one of second and third accessing inputs, a third terminal of each device in a pair being connected to a different one of first and second accessing pairs; and
- two pairs of controlled charge carrier devices, each device having three terminals, a first terminal of each device in a pair connecting to a corresponding one of the accessing pairs, a second terminal of each device in a pair being connected to the same one of a first and second gate input which is different for each pair, and the third terminal of each device in a pair providing one of a pair of sense connections corresponding to that pair of devices.

13. The binary storage cell of claim 12, wherein each controlled charge carrier device is a semiconductive element.

14. The binary storage cell as defined in claim 13, wherein each semiconductive element operates as a field effect transistor.

* * * * *